United States Patent
Zhou et al.

(10) Patent No.: US 9,839,080 B2
(45) Date of Patent: Dec. 5, 2017

(54) LED DRIVER AND CONTROL METHOD

(71) Applicant: PHILIPS LIGHTING HOLDING B.V., Eindhoven (NL)

(72) Inventors: Liwen Zhou, Eindhoven (NL); Qi Zhang, Eindhoven (NL); Shujin Zhuang, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/110,399

(22) PCT Filed: Dec. 29, 2014

(86) PCT No.: PCT/EP2014/079350
§ 371 (c)(1),
(2) Date: Jul. 7, 2016

(87) PCT Pub. No.: WO2015/106944
PCT Pub. Date: Jul. 23, 2015

(65) Prior Publication Data
US 2016/0338158 A1    Nov. 17, 2016

(30) Foreign Application Priority Data

Jan. 17, 2014  (WO) ................ PCT/CN2014/000062
Apr. 25, 2014  (EP) .................................... 14166025

(51) Int. Cl.
H05B 37/02    (2006.01)
H05B 33/08    (2006.01)

(52) U.S. Cl.
CPC ..... *H05B 33/0815* (2013.01); *H05B 33/0818* (2013.01); *H05B 33/0845* (2013.01); *Y02B 20/346* (2013.01)

(58) Field of Classification Search
CPC ............ H05B 33/0815; H05B 33/0851; H05B 33/0818; H05B 33/0845; Y02B 20/346
USPC ........................................................ 315/224
See application file for complete search history.

(56) References Cited

U.S. PATENT DOCUMENTS

| | | |
|---|---|---|
| 7,755,342 B2 | 7/2010 | Chen et al. |
| 9,295,115 B2 * | 3/2016 | Esaki ................ H05B 33/0815 |
| 2012/0217892 A1 | 8/2012 | Chu et al. |
| 2014/0361704 A1 * | 12/2014 | Schmidl ............ H05B 33/0815 |
| | | 315/210 |
| 2017/0006683 A1 * | 1/2017 | Shiyu ................ H05B 33/0851 |

FOREIGN PATENT DOCUMENTS

| | | |
|---|---|---|
| EP | 0758159 A2 | 2/1997 |
| GB | 2492833 A | 1/2013 |
| JP | 2012227051 A | 11/2012 |

* cited by examiner

*Primary Examiner* — Don Le
(74) *Attorney, Agent, or Firm* — Akarsh P. Belagodu

(57) ABSTRACT

A DC-DC converter has a pulse width control circuit producing a sequence of pulses, with an on time, an off time and a switching frequency. The on time as well as the switching frequency are both varied in dependence on a dimming setting.

11 Claims, 5 Drawing Sheets

LED DRIVER AND CONTROL METHOD

CROSS-REFERENCE TO PRIOR APPLICATIONS

This application is the U.S. National Phase application under 35 U.S.C. §371 of International Application No. PCT/EP2014/079350, filed on Dec. 29, 2014, which claims the benefit of European Patent Application No. 14166025.8, filed on Apr. 25, 2014, and Chinese Patent Application No. PCT/CN2014/000062,filed on Jan. 17,2014. These applications are hereby incorporated by reference herein.

FIELD OF THE INVENTION

The invention relates to LED drivers and control methods for driving LEDs, in particular with a dimming control function.

BACKGROUND OF THE INVENTION

LEDs are typically driven using a DC-DC converter. The converter accepts a DC input voltage and provides a DC output voltage.

For many applications, DC-DC converters are configured to provide a regulated DC output voltage to a load based on an unregulated DC input voltage. A DC-DC converter may be employed to transform an unregulated voltage provided by any of a variety of DC power sources to a more appropriate regulated voltage for driving a given load. The unregulated DC input voltage is typically derived from a mains AC power source which is rectified and filtered by a bridge rectifier/filter circuit arrangement.

FIG. 1 shows a circuit diagram of a conventional step-down DC-DC converter 50 configured to provide a regulated DC output voltage 32 (Vout) to a load 40, based on a higher unregulated DC input voltage 30 (Vin). The step-down converter of FIG. 1 also is commonly referred to as a "buck" converter. From a functional standpoint, the buck converter of FIG. 1 generally is representative of other types of DC-DC converters.

DC-DC converters like the buck converter of FIG. 1 employ a transistor or equivalent device 20 that is configured to operate as a saturated switch which selectively allows energy to be stored in an energy storage device 22. The energy storage device 22 is shown as an inductor L in FIG. 1.

Although FIG. 1 illustrates such a transistor switch as a bipolar junction transistor (BJT), field effect transistors (FETs) also may be employed as switches in various DC-DC converter implementations. By virtue of employing such a transistor switch, DC-DC converters also are commonly referred to as "switching regulators" due to their general functionality.

The transistor switch 20 in the circuit of FIG. 1 is operated to periodically apply the unregulated DC input voltage 30 (Vin) across the inductor 22 (L) for relatively short time intervals (in FIG. 1 a single inductor is depicted to schematically represent one or more actual inductors arranged in any of a variety of serial/parallel configurations to provide a desired inductance).

During the intervals in which the transistor switch is "on" or closed and thereby passing the input voltage Vin to the inductor, current flows through the inductor based on the applied voltage and the inductor stores energy in its magnetic field. When the switch is turned "off" or opened so that the DC input voltage is removed from the inductor, the energy stored in the inductor is transferred to a filter capacitor 34 which functions to provide a relatively smooth DC output voltage Vout to the load 40.

When the transistor switch 20 is on, a voltage $V_L$=Vout−Vin is applied across the inductor 22. This applied voltage causes a linearly increasing current $I_L$ to flow through the inductor (and to the load and the capacitor) based on the relationship $V_L = L dI_L/dt$.

When the transistor switch 20 is turned off, the current $I_L$ through the inductor continues to flow in the same direction, with a diode 24 (D1) now conducting to complete the circuit. As long as current is flowing through the diode 24, the voltage $V_L$ across the inductor is fixed at Vout−Vdiode, causing the inductor current $I_L$ to decrease linearly as energy is provided from the inductor's magnetic field to the capacitor and the load.

FIG. 2 is a diagram illustrating various signal waveforms for the circuit of FIG. 1 during the switching operations described above.

Conventional DC-DC converters may be configured to operate in different modes, commonly referred to as "continuous" mode, "discontinuous" mode or "critical" mode.

In continuous mode operation, the inductor current $I_L$ remains above zero during successive switching cycles of the transistor switch. In critical mode, the inductor current starts at zero at the beginning of a given switching cycle and returns to zero at the end of the switching cycle. In discontinuous mode, the inductor current starts at zero at the beginning of a given switching cycle and returns to zero before the end of the switching cycle.

FIG. 3 shows waveforms for the continuous mode assuming no voltage drops across the transistor switch when the switch is on (i.e., conducting) and that there is a negligible voltage drop across the diode D1 while the diode is conducting current. The changes in inductor current over successive cycles are shown in FIG. 3 superimposed on the voltage at the point $V_X$ shown in FIG. 1, based on the operation of the transistor switch 20 and the current through the inductor $I_L$ for two consecutive switching cycles. The horizontal axis represents time t and a complete switching cycle is represented by the time period T, wherein the transistor switch "on" time is indicated as $t_{on}$ and the switch "off" time is indicated as $t_{off}$ (i.e., T=+$t_{on}$ +$t_{off}$).

For steady state operation, the inductor current $I_L$ at the start and end of a switching cycle is essentially the same, as can be observed in FIG. 3 by the indication Ip. Accordingly, from the relation $V_L = L dI_L/dt$, the change of current over one switching cycle is zero, and may be given by:

$$dI_L = 0 = \frac{1}{L}\left(\int_0^{t_{out}}(V_{in} - V_{out})dt + \int_{t_{on}}^{T}(-V_{out})dt\right)$$

which simplifies to $$(V_{in} - V_{out})t_{on} - (V_{out})(T - t_{on}) = 0$$

or $$\frac{V_{out}}{V_{in}} = \frac{t_{on}}{T} = D,$$

D is defined as the "duty cycle" of the transistor switch, or the proportion of time per switching cycle that the switch is on and allowing energy to be stored in the inductor. It can be seen that the ratio of the output voltage to the input voltage is proportional to D; namely, by varying the duty cycle D of the switch in the circuit of FIG. 1, the output voltage Vout may be varied with respect to the input voltage Vin but cannot exceed the input voltage, as the maximum duty cycle D is 1.

The conventional buck converter of FIG. 1 is particularly configured to provide to the load 40 a regulated output voltage Vout that is lower than the input voltage Vin. To ensure stability of the output voltage Vout, the buck converter employs a feedback control loop 46 to control the operation of the transistor switch 20. Generally, as indicated in FIG. 1 by connection 47, power for various components of the feedback control loop 46 may be derived from the DC input voltage Vin or alternatively another independent source of power.

A scaled sample voltage Vsample of the DC output voltage Vout is provided as an input to the feedback control loop 46 (via the resistors R2 and R3) and compared by an error amplifier 28 to a reference voltage Vref. The reference voltage is a stable scaled representation of the desired regulated output voltage Vout. The error amplifier 28 generates an error signal 38 based on the comparison of Vsample and Vref and the magnitude of this error signal ultimately controls the operation of the transistor switch 20, which in turn adjusts the output voltage Vout via adjustments to the switch duty cycle. In this manner, the feedback control loop maintains a stable regulated output voltage Vout. In particular, the error signal 38 serves as a control voltage for a pulse width modulator 36 which also receives a pulse stream 42 having a frequency/=1/T provided by an oscillator 26. In conventional DC-DC converters, exemplary frequencies for the pulse stream range from approximately 50 kHz to 100 kHz. The pulse width modulator 36 is configured to use both the pulse stream 42 and the error signal 38 to provide an on/off control signal 44 that controls the duty cycle of the transistor switch 20. In essence, a pulse of the pulse stream 42 acts as a "trigger" to cause the pulse width modulator to turn the transistor switch 20 on, and the error signal 38 determines how long the transistor switch stays on and hence the duty cycle D.

The continuous mode is described above. The "discontinuous" or "burst" mode is used to improve the light-load efficiency of the power converter, to help save energy and extend the battery life of devices. Switching losses can also be reduced by reducing the switching frequency at these light load conditions. When the load current is high, it is preferable to operate the power converter in a fixed frequency continuous mode as this allows a fast transient response, higher efficiency, and a narrower-spread noise spectrum. When the load current is low, the control switch turns on for a few consecutive cycles and stays off until the output voltage drops below the threshold. However, this burst mode operation is in some cases not desirable because a burst mode at light load can cause the switching noise spectrum to spread to a wide range, imposing EMI issues and giving visible flickering when driving an LED.

There is a need to control the transition between different modes. U.S. Pat. No. 7,755,342 discloses a circuit for transitioning between a fixed frequency mode and a discontinuous mode. However, there is an abrupt change in the circuit response at the transition between modes. Furthermore, this approach makes use of the burst mode which can give rise to flickering.

SUMMARY OF THE INVENTION

The invention is defined by the claims.

According to the invention, there is provided

An LED driver comprising:

a DC-DC converter having a pulse width control circuit producing a sequence of pulses, with an on time, an off time and a switching frequency; and a control circuit having an input for receiving a dimming setting, wherein the control circuit is for controlling the pulse width control circuit to vary the on time as well as the pulse frequency in dependence on the dimming setting, wherein for at least one range of dimming settings, the control circuit is adapted to vary both the on time and the switching frequency as a function of the dimming setting, the relative dominances of switching frequency variation and on-time variation being depending on the dimming setting.

By simultaneously controlling the switching frequency (which is the repeat frequency of the combined on time and off-time) and the on time, a smooth transition is provided between the circuit functions at different dimming settings. At low dimming levels, the switching frequency can be low which enables the output lamp current to be made lower for a given a minimum on time of the driver controller. At high dimming levels, the switching frequency can be high to make the output lamp current ripple lower and enable a smaller size magnetic component (for example inductor) and thus a smaller driver.

Preferably, the DC-DC converter has a burst mode, and the control circuit is adapted to vary the switching frequency for low dimming settings to prevent the converter entering the burst mode. These low dimming settings for which the burst mode could otherwise be started can for example comprise dimming settings below 10%.

The minimum on time can have a value in the range 0.2% to 2% of the switching period. For example the on time can be reduced to around 0.5% for the deepest permitted dimming setting.

The minimum switching frequency can be in the range 0.2% to 5% of the maximum switching frequency. For example the switching frequency can be reduced to around 0.5% for the deepest permitted dimming setting.

At a dimming setting of 10%, the switching frequency can be in the range 30% to 60% of the maximum switching frequency. This 10% value can be considered as the boundary between a low dimming setting and a very low or deep dimming setting, at which the burst mode needs to be prevented. Thus, the switching frequency change takes place predominantly at the lowest dimming settings.

At this same 10% dimming setting, the on time can be in the range 0.5% to 2% of the switching period. Thus, the change in on time from this boundary to the deepest dimming setting is less, and most of the change takes place at larger dimming settings. In this way, frequency control is dominant for low dimming settings and on time control is dominant for high dimming settings (i.e. near full brightness).

By way of example, the maximum switching frequency can be between 10 kHz and 1 MHz and the minimum switching frequency can be between 50 Hz and 100 kHz. The maximum on time can be between 1 μs and 100 μs and the minimum on time can be between 10 ns and 1 μs.

The invention also provides a lighting system, comprising a driver of the invention and an LED lighting arrangement driven by the driver.

The invention also provides an LED driving method comprising:
producing a sequence of pulses, with an on time, an off time and a switching frequency; and
controlling the pulse sequence to vary the on time as well as the switching frequency in dependence on a dimming setting,
wherein for at least one range of dimming settings, the method comprises varying both the on time and the switching frequency as a function of the dimming setting, the relative dominances of switching frequency variation and on-time variation being depending on the dimming setting.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a DC-DC converter having a pulse width control circuit producing a sequence of pulses, with an on time, an off time and a switching frequency. The on time as well as the switching frequency are both varied in dependence on a dimming setting. In particular, for at least one range of dimming settings, both parameters vary at each change in dimming setting.

Figure 4:
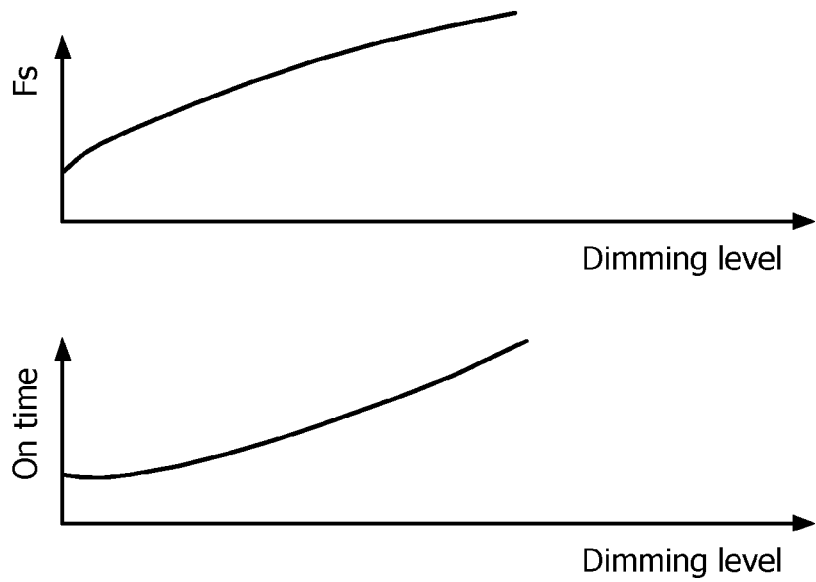
FIG. 4 shows timing diagrams to explain a control approach according to an embodiment.

FIG. 4 shows how the on time ("On time") and switching frequency ("Fs") can both be controlled in dependence on the dimming setting. A low dimming level represents low brightness (i.e. a large amount of dimming) whereas a high dimming level represents high brightness (i.e. a small amount of dimming). For example the dimming level is expressed as a percentage. A dimming level of 1% represents a brightness output of 1% of the maximum output intensity.

In this example, the two functions both vary for the full dimming range. As will be explained below, the two functions may only vary simultaneously in the manner shown for a portion of the range of dimming settings.

These functions can be defined as below.

$$Fs = a(x)$$

$$\text{On time} = b(x)$$

In the above functions, x is the dimming level.
For the range of permitted dimming levels x, the first order partial differential of $a(x)$ shall be:

$$\frac{\Delta a(x)}{\Delta x} \neq 0$$

and $$\frac{\Delta a(x)}{\Delta x}$$

is continuously differentiable

Similarly, in the available range of dimming levels the first order partial differential of $b(x)$ shall be $$\frac{\Delta b(x)}{\Delta x} \neq 0$$

and $$\frac{\Delta b(x)}{\Delta x}$$

is continuously differentiable

These conditions mean that the functions never have zero gradient, so every change in dimming level causes a change in both Fs and On time. For the permitted range of x, the second order partial differential of $a(x)$ shall be $$\frac{\Delta^2 a(x)}{\Delta x^2} \neq 0$$

and $$\frac{\Delta^2 a(x)}{\Delta x^2} < 0$$

In the permitted range of x, the second order partial differential of $b(x)$ shall be $$\frac{\Delta^2 b(x)}{\Delta x^2} \neq 0$$

and $$\frac{\Delta^2 b(x)}{\Delta x^2} > 0$$

These relationships mean the switching frequency variation is steeper at low dimming levels, whereas the on time variation is flatter at low dimming levels. Thus, at low dimming levels the switching frequency control is dominant. At high dimming levels, the on time variation is steeper and therefore dominant, and the switching frequency function is flatter and therefore is more static. Generally, the relative dominances of on-time variation and switching frequency variation are adapted as a function of the dimming level.

By way of example, the curve functions can be $$Fs = 240000\sqrt{x} + 10000$$

$$\text{On time} = 0.000002x^2 + 0.0000002$$

$$x \in (0.1\%, 100\%)$$

In the range $x \in (0.1\%, 100\%)$ which assumes a permitted dimming range of 0.1% to 100%

$$Fs \in (17589, 250000)$$

$$\text{On time} \in (0.0000002, 0.0000022)$$

For these functions the first order partial differential of Fs is $$\frac{\Delta Fs}{\Delta x} = \frac{120000}{\sqrt{x}}$$

In the range x∈(0.1%, 100%)

$$\frac{\Delta Fs}{\Delta x} \in (120000, 3794733)$$

The first order partial differential of on time is $$\frac{\Delta \text{on time}}{\Delta x} = 0.000004x$$

In the range x∈(0.1%, 100%)

$$\frac{\Delta \text{on time}}{\Delta x} \in (0.000000004, 0.000004)$$

The second order partial differential of Fs is $$\frac{\Delta^2 Fs}{\Delta x^2} = \frac{-60000}{\sqrt{x^3}}$$

In the range x∈(0.1%, 100%)

$$\frac{\Delta^2 Fs}{\Delta x^2} < 0$$

The Second order partial differential of on time is $$\frac{\Delta^2 \text{on time}}{\Delta x^2} = 0.000004$$

In the range x∈(0.1%, 100%)

$$\frac{\Delta^2 \text{on time}}{\Delta x^2} > 0$$

The control shown in FIG. 4 provides a balance between adjustment of the pulse width on time and/or switching frequency depending on the input dimming level. The two functions can be implemented automatically as one control method, in which the control effect of frequency will dominate the dimming output at deep dimming conditions, and the control effect of the on time will dominate the dimming output at other dimming conditions.

This approach provides smooth control of the dimming output.

For the purposes of explanation, the dimming level can be categorized into "deep" dimming levels from the minimum dimming level (e.g. 0.1%) up to a threshold (e.g. between 1% and 10% dimming), and "low" dimming levels around and above this threshold.

By way of example, when the dimming reaches a 1% boundary between low and deep dimming, the on time can for example have decreased down to 1% (from a maximum of 100%) whereas the frequency can only have dropped down to around 50% (from the maximum 100% frequency). Moving to the lowest 0.1% dimming condition, the switching frequency can then decrease for example from around 50% to around 0.5% whereas the on time will only change for example from the 1% to around 0.5%.

In more general terms, if a threshold is defined at a dimming setting of 10%, the switching frequency can be in the range 30% to 60% of the maximum switching frequency and the on time in the range 0.5% to 2% of the switching period at this threshold. The minimum switching frequency (given as 0.5% in the example above) can more generally be in the range 0.2% to 5% of the maximum switching frequency and the minimum on time (given as 0.5% in the example above) can be in the range 0.2% to 2% of the switching period.

In numerical terms, the on time can decrease from a maximum of several tens of microseconds or several microseconds to several hundred nanoseconds or even several tens of nanoseconds. The frequency can decrease from several hundred kHz or several tens of kHz to several tens of kHz or even several tens of Hz at the deepest dimming condition of e.g. 0.1%.

The deep dimming condition is enabled without the controller entering the burst mode, by virtue of the reduction in switching frequency. Without reduction in switching frequency, at deep dimming conditions the controller will reduce the on time to its minimum on time value, and if the power energy transfer is still higher than desired, the controller will stop the pulse width modulator until the power energy transfer is lower than desired. The controller will then be restarted to transfer power energy. In the burst mode, the output energy is not stable and without control so that light flicker or other effects can be observed.

If the switching frequency can be reduced at deep dimming conditions, so that both switching frequency and on time are reduced, it is possible to extend the minimum power energy transfer per cycle and in this way the output power energy is under control and stable.

In the example above shown in FIG. 4, the full dimming range has simultaneous control of the switching frequency and on time. However, this dual control may, if desired, only be applied to a middle region of the dimming settings. For example for lowest dimming levels (i.e. maximum dimming) there may be control only of the switching frequency. Alternatively, for the highest dimming levels (smallest amount of dimming) only the one time may be controlled.

These two examples mean there are two dimming ranges. The region with control of both on time and frequency enables the transition between them to be made smoother.

These two approaches may be combined to provide three dimming ranges, the central one having the dual frequency and on time control.

Figure 5:
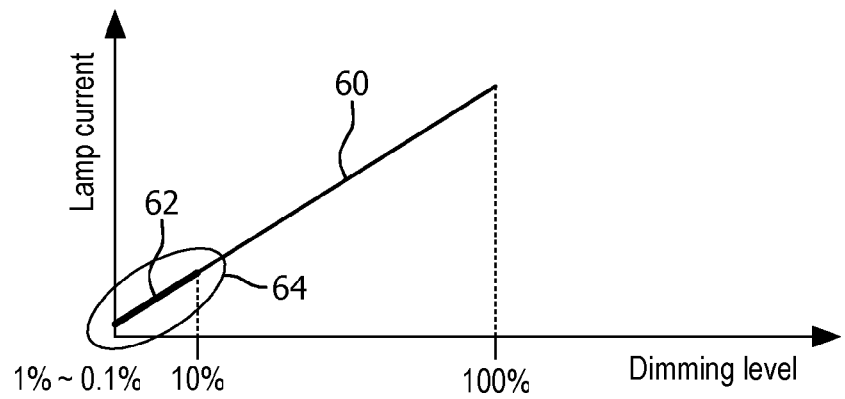
FIG. 5 shows how the dimming range can be extended by the control approach.

The approach explained above enables the dimming range to be extended. FIG. 5 shows as plot 60 the relationship between dimming level and LED current for a conventional approach. The minimum dimming level is 10%. The control approach explained above enables the curve to be extended by section 62 so that the minimum dimming level can be lowered to below 1%, and even can approach or reach 0.1%. The transition 64 to this deep dimming regime is also kept smooth by controlling both the switching frequency and the on time for dimming levels at dimming levels around the transition point 64.

Figure 6:
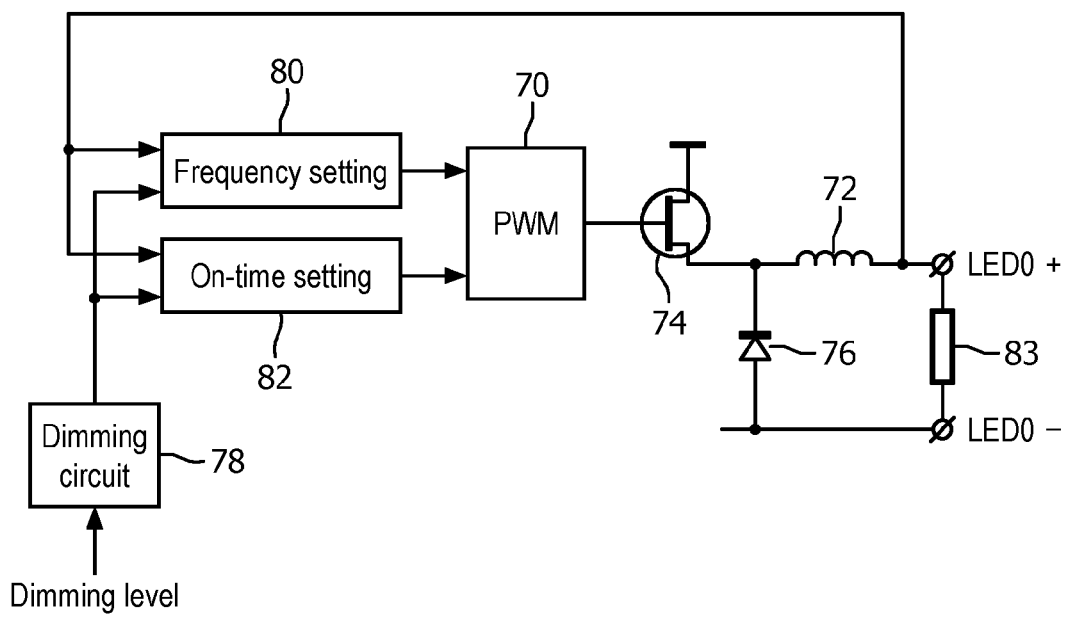
FIG. 6 shows in schematic form a circuit for implementing a control approach according to an embodiment.

FIG. 6 shows in schematic form an example of circuit for implementing the control approach explained above. The DC-DC converter providing PWM control is shown as 70. This can be a buck converter as described above with reference to FIG. 1.

However, other types of conventional DC-DC converters can be used, such as a "boost" converter which provides a regulated DC output voltage that is higher than the input voltage, an inverting or "buck-boost" converter that may be configured to provide a regulated DC output voltage that is either lower or higher than the input voltage and has a polarity opposite to that of the input voltage, and a "Cuk" converter that is based on capacitive coupled energy transfer principles. Like the buck converter, in each of these other types of converters the duty cycle D of the transistor switch determines the ratio of the output voltage Vout to the input voltage Vin.

The energy storage device is again shown as inductor 72 but other types of converter can use capacitors instead. The switching transistor is shown as 74 and the diode as 76.

The circuit has a dimming setting circuit 78 to which the desired dimming level is provided as input. The dimming setting circuit then controls a frequency setting circuit 80 which provides frequency setting of the PWM operation, and an on time setting circuit 82 which provides setting of the on time of the PWM operation. These then control the DC-DC converter circuit to provide the desired operation.

The functions described above are provided by the way the dimming setting circuit 78 controls the frequency and on time setting circuits 80,82.

FIG. 6 shows a load in the form of an LED arrangement 83. This can be one or more LEDs, with single colour or different colours to enable colour point control.

The control can be implemented in hardware or in software.

For a software implementation the dimming level can be processed by a controller to derive suitable control inputs for controlling the DC-DC converter in the desired manner. Components that may be employed for such a controller include, but are not limited to, conventional microprocessors, application specific integrated circuits (ASICs), and field-programmable gate arrays (FPGAs). In this case, the dimming circuit, frequency setting circuit and on time setting circuit could be implemented by a shared processor.

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

The circuits can instead be implemented as analogue circuit components.

Figure 7:
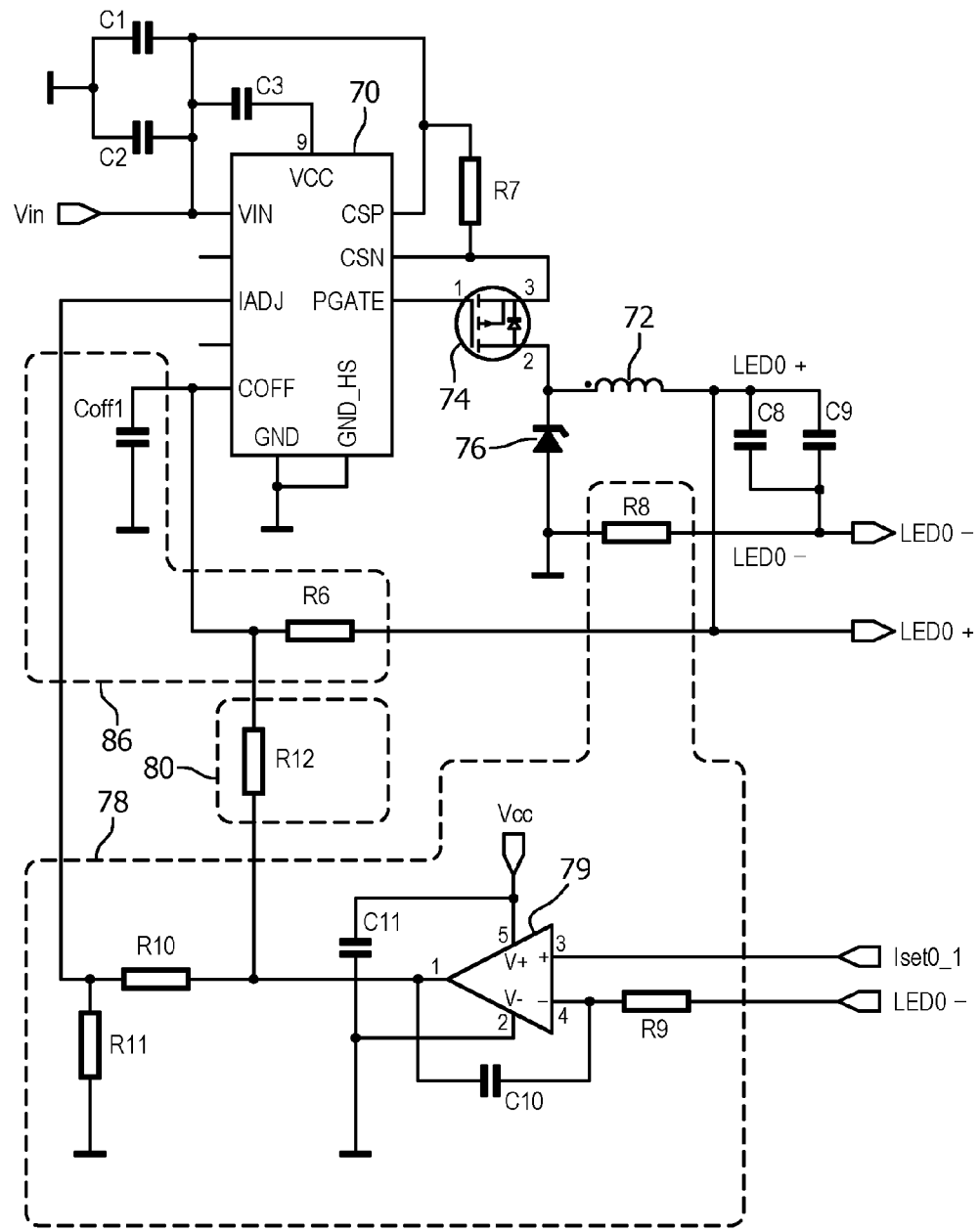
FIG. 7 shows in more detail and analogue circuit implementation of the circuit of FIG. 6.

FIG. 7 shows one example of possible circuit in more detail using analogue components.

The DC-DC converter and PWM controller 70 is implemented as a fixed off-time buck controller chip.

The resistor R7 is a buck inductor current sensing resistor which is used for control of the PWM controller 70. The transistor 74 will be turned off if the voltage across R7 reaches the dimming setting provided to the PWM controller 70. This dimming setting is generated by the components of the dimming circuit 78.

Figure 1:
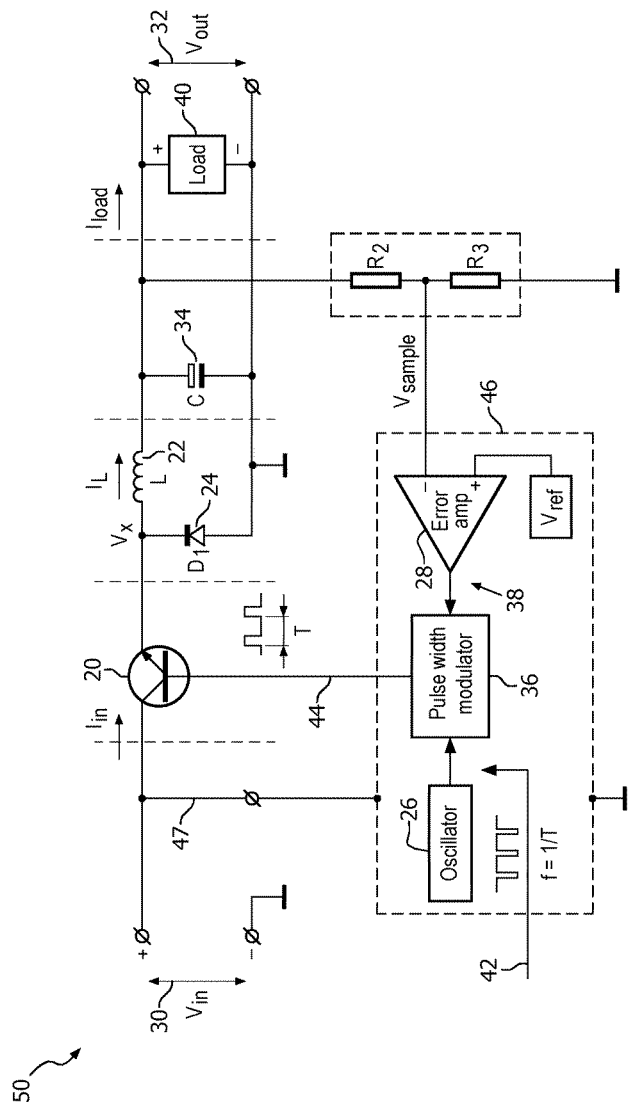
FIG. 1 shows a known DC-DC converter circuit for driving an LED load.
Figure 2:
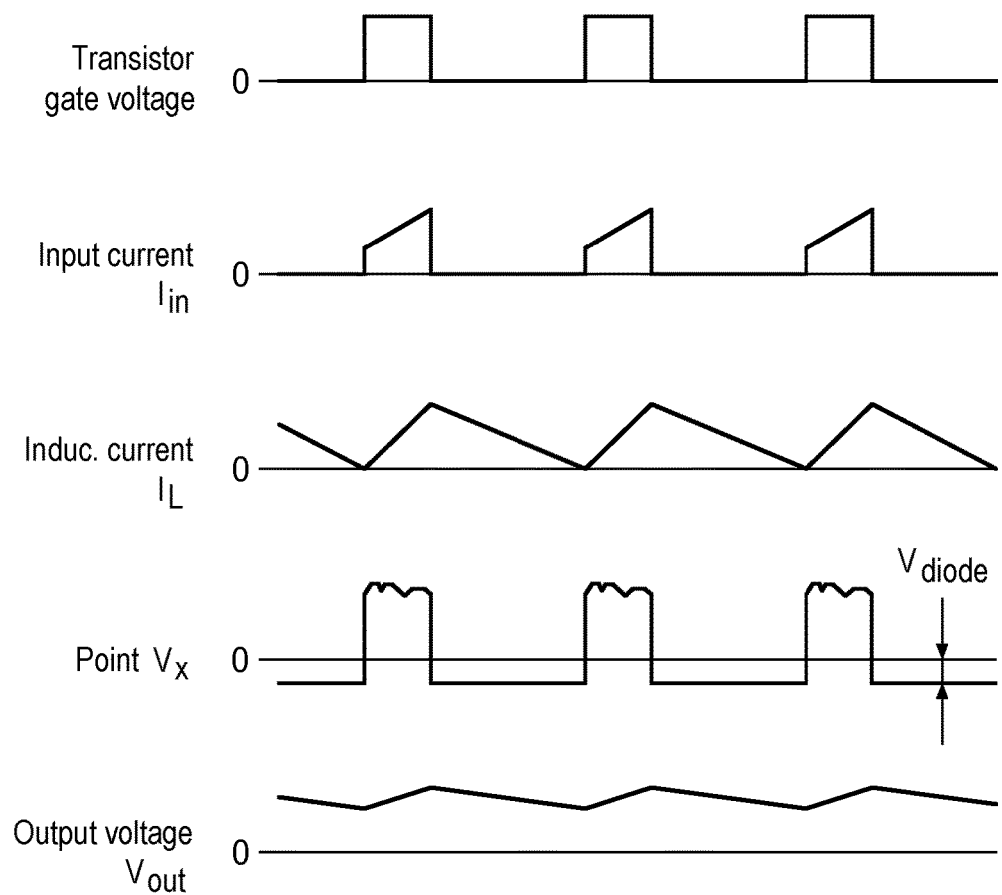
FIG. 2 shows a first set of timing diagrams to explain the operation of the circuit of FIG. 1.
Figure 3:
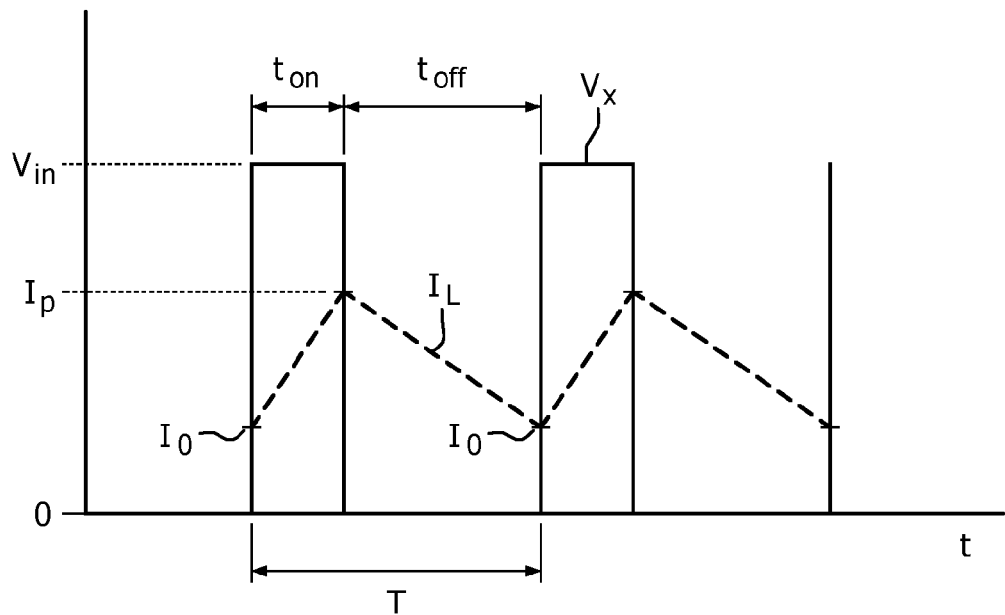
FIG. 3 shows a further timing diagram to explain the operation of the circuit of FIG. 1.

The dimming circuit 78 essentially functions in the same way as the feedback circuit 46 of FIG. 1, by providing a reference voltage which corresponds to the desired dimming setting. Thus, the dimming circuit 78 comprises an error amplifier 79 which has a dimming setting level input Iset0_1.

In the dimming circuit 78, a resistor R8 forms a current sensing circuit which represents the lamp current. Resistor R9 and capacitor C10 form the error amplifier circuit with the amplifier 79, and the output of the error amplifier circuit is a regulated error amplified signal. Resistors R10 and R11 form a voltage divider circuit which determines both the function of on time vs. dimming level and the function of switching frequency vs. dimming level. The divided output at the junction between the resistors is essentially used to control the on time, while the error amplifier circuit output is used to control the frequency.

The error amplified signal is connected to a capacitor Coff1 by circuit 80 to determine the function of switching frequency vs. dimming level.

The output signal of the voltage divider circuit (R10 and R11) connects to a current adjustment pin IADJ pin of the PWM circuit 70. The voltage provided to the IADJ pin determines the peak inductor current, and the off time is controlled by an oscillation circuit defined by the controller 70, the capacitor Coff1 and resistors R6 and R12.

Within PWM circuit 70 there is a compare circuit which processes the voltage on Coff1. While the voltage of Coff1 is lower than a threshold, the transistor 74 is turned off until voltage of Coff1 reaches certain level. The voltage on Coff1 will then be discharged by a discharging circuit in block 70.

The off time can thus be adapted by changing the charge current from R12 and R6. If the charge current from R12 or R6 is higher, time to charge Coff1 to a certain level will be shorter which means off time will be shorter. At a certain dimming level and output voltage, the off time is fixed since the error amplified signal and output voltage is constant at steady state so that output current can be controlled by peak current of inductor 72. The on time of the transistor 74 is controlled by the error amplified signal of circuit 79. If the output current is lower than Iset0_1, the error amplified signal will be increased so that the on time of component 74 will be longer, and the peak inductor current will be higher. By fixed off time control, the output current will be increased also until it meets the level of Iset0_1.

Fine tuning of the parameters for R6, R12, Coff1, R10 and R11 can be used to adapt the on time and switching frequency curves vs. dimming level. If dimming level Iset0_1 is changed, the error amplified signal will be changed also so that the on time and off time will be changed, which also changes the switching frequency.

Thus, generally the frequency setting circuit 80 is implemented as a feedback resistor R12 to the change switching frequency of the transistor 74. At low dimming levels, the output voltage of the dimming circuit amplifier 79 is low, giving a low charge current from R12. This makes the switching frequency lower. At high output dimming level, the output voltage of amplifier 79 is high and the charge current from R12 is high which will make the switching frequency high.

This switching frequency is thus related not only to the output lamp voltage but also lamp current dimming level. During the stage from high dimming level to low dimming level, the lamp voltage of the OLED is not changed by a large amount, for example from 15V to 14V which means charge current through R6 is not changed greatly. However, due to the large change of dimming level, the output voltage of amplifier 79 will change by a large amount so that the charge current from R12 will change a large amount which will change the switching frequency.

At low dimming levels, the minimum on time of the controller 70 can limit the minimum dimming level, but by changing to lower switching frequency, the dimming level can be lower even at the minimum on time of the controller. Normally if a lower dimming level is necessary, the controller will enter into its burst mode at the minimum on time which will cause system instability and light flicker. By changing to a lower switching frequency, the dimming level can be lower even at the minimum on time, while avoiding that the controller enters into the burst mode at minimum on time.

The switching frequency can be maintained high at a high output level, which means lower current ripple and lower size of the inductor to make the driver smaller and lower cost.

In above example, the charge current provided through the resistor R12 is linearly proportional to the dimming level, but this is not essential. The charge current through R12 can be nonlinearly related to the dimming level or hysteretic control can be used. Hysteretic control can be used to assist in preventing light flicker and system instability during transition between dimming levels.

FIG. 7 provides only one example of analogue circuit implementation. There are however many other possible circuits. Essentially, the control inputs to the DC-DC converter are controlled to implement the desired functions with respect to dimming level.

The invention enables the dimming range to be extended. For example, the typical dimming range for an analogue dimming system has a lowest dimming level in the range of 1% to 10%. The control method described above enables the lowest dimming level to be extended to fall within the range 0.1% to 1% (as a percentage of the maximum brightness).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An LED driver comprising:
   a DC-DC converter having a pulse width control circuit producing a sequence of pulses, with an on time, an off time and a switching frequency; and
   a control circuit having an input for receiving a dimming setting, wherein the control circuit is for controlling the pulse width control circuit to vary the on time as well as the switching frequency in dependence on the dimming setting,
   wherein for at least one range of dimming settings, the control circuit is adapted to vary both the on time and the switching frequency as a function of the dimming setting, the relative dominances of switching frequency variation and on-time variation being depending on the dimming setting,
   wherein the minimum on time has a value in the range 0.2% to 2% of the switching period, and/or wherein the minimum switching frequency is in the range 0.2% to 5% of the maximum switching frequency.

2. A driver as claimed in claim 1, wherein the DC-DC converter has a burst mode, and the control circuit is adapted to vary the switching frequency for low dimming settings to prevent the converter entering the burst mode.

3. A driver as claimed in claim 1, wherein at a dimming setting of 10%, the switching frequency is in the range 30% to 60% of the maximum switching frequency.

4. A driver as claimed in claim 1, wherein at a dimming setting of 10%, the on time is in the range 0.5% to 2% of the switching period.

5. A driver as claimed in claim 1, wherein the maximum switching frequency is between 10 kHz and 1 MHz and the minimum switching frequency is between 50 Hz and 100 kHz.

6. A driver as claimed in claim 1, wherein the maximum on time is between 1 µs and 100 µs and the minimum on time is between 10 ns and 1 µs.

7. A lighting system, comprising:
   a driver as claimed in claim 1; and
   an LED lighting arrangement driven by the driver.

8. A method as claimed in claim 1, wherein:
   the maximum switching frequency is between 10 kHz and 1 MHz and the minimum switching frequency is between 50 Hz and 100 kHz; and/or
   the maximum on time is between 1 µs and 100 µs and the minimum on time is between 10 ns and 1 µs.

9. An LED driving method comprising:
   producing a sequence of pulses, with an on time, an off time and a switching frequency; and
   controlling the pulse sequence to vary the on time as well as the switching frequency in dependence on a dimming setting,
   wherein for at least one range of dimming settings, the method comprises varying both the on time and the switching frequency as a function of the dimming setting, the relative dominances of switching frequency variation and on-time variation being depending on the dimming setting, and
   wherein:
   the minimum on time has a value in the range 0.2% to 2% of the switching period; and/or
   the minimum switching frequency is in the range 0.2% to 5% of the maximum switching frequency.

10. A method as claimed in claim 9, wherein the sequence of pulses is provided by a DC-DC converter with a burst mode, and the method comprising varying the switching frequency for low dimming settings to prevent the converter entering the burst mode.

11. A method as claimed in claim 9, wherein at a dimming setting of 10%:
   the switching frequency is in the range 30% to 60% of the maximum switching frequency; and/or
   the on time is in the range 0.5% to 2% of the switching period.

* * * * *